United States Patent
Jin et al.

(10) Patent No.: US 8,270,277 B2
(45) Date of Patent: Sep. 18, 2012

(54) OPTICAL DISK DEVICE AND OPTICAL DISK RECORDING METHOD

(75) Inventors: Gohshi Jin, Matsudo (JP); Shuichi Minamiguchi, Tokyo (JP); Satoru Moriya, Tokyo (JP)

(73) Assignee: Hitachi-LG Data Storage, Inc., Tokyo (JP)

(*) Notice: Subject to any disclaimer, the term of this patent is extended or adjusted under 35 U.S.C. 154(b) by 0 days.

(21) Appl. No.: 13/301,824

(22) Filed: Nov. 22, 2011

(65) Prior Publication Data

US 2012/0134253 A1    May 31, 2012

(30) Foreign Application Priority Data

Nov. 25, 2010  (JP) ................................ 2010-262340

(51) Int. Cl.
    *G11B 11/00*  (2006.01)
(52) U.S. Cl. .................. 369/53.27; 369/53.28
(58) Field of Classification Search .......... None
    See application file for complete search history.

(56) References Cited

U.S. PATENT DOCUMENTS

| | | | |
|---|---|---|---|
| 2008/0253238 A1* | 10/2008 | Kaku et al. ................. | 369/44.11 |
| 2008/0279058 A1* | 11/2008 | Sasaki et al. ............... | 369/44.27 |
| 2011/0110206 A1* | 5/2011 | Shiozawa ................... | 369/44.32 |
| 2011/0158063 A1* | 6/2011 | Minamiguchi et al. ..... | 369/44.26 |

FOREIGN PATENT DOCUMENTS

| | | |
|---|---|---|
| JP | 2000-163782 | 6/2000 |
| WO | WO 2005/043521 A1 | 5/2005 |

* cited by examiner

*Primary Examiner* — Paul Huber
(74) *Attorney, Agent, or Firm* — Antonelli, Terry, Stout & Kraus, LLP.

(57) ABSTRACT

An optical disk device and recording method of recording data on an optical disk by driving a laser light source with a driving current superimposed with a high-frequency current. The device and method includes a controller for disabling tracking servo and establishing conditions for reproducing a signal from a predetermined region of the optical disk, for generating a tracking error signal by superimposing the high-frequency current varied in amplitude on the driving current for the laser light source, for determining an amplitude of the high-frequency current that provides an optimum quality of the generated tracking error signal, and for recording data on the optical disk by applying the driving current for the laser light source superimposed with the high-frequency current of the determined amplitude.

10 Claims, 7 Drawing Sheets

OPTICAL DISK DEVICE AND OPTICAL DISK RECORDING METHOD

CLAIM OF PRIORITY

The present application claims priority from Japanese patent application serial no. JP 2010-262340, filed on Nov. 25, 2010, the content of which is hereby incorporated by reference into this application.

BACKGROUND OF THE INVENTION (1) Field of the Invention

The present invention relates to an optical disk device and optical disk recording method. More particularly, the invention relates to a technique of recording by driving a laser light source with a driving current suitably superimposed with a high-frequency current.

(2) Description of the Related Art

The optical disk device records and reproduces data by applying laser light on an optical disk. If, in this process, a part of the light reflected from the optical disk enters a laser diode as a light source, the incident light causes instable laser oscillation so that recording and reproduction characteristics of the device are deteriorated. Known as a countermeasure against this problem is a technique of effecting multimode laser emission by driving the laser diode with the driving current superimposed with the high-frequency current, thereby suppressing noises caused by a feedback light.

It is preferred that the amplitude of the high-frequency current superimposed on the laser driving current is set to a proper level according to each recording power or reproduction power applied at recording time or reproduction time. At the recording time, however, an output limit of the laser diode need be taken into consideration when setting the amplitude of the high-frequency current to the proper level.

As a technique related to this control, JP-A No. 2000-163782 discloses an arrangement wherein the amplitude or duty of the high-frequency component is changed between the recording time and the reproduction time and wherein at the recording time, an operation of superimposing the high-frequency component is controllably enabled or disabled according to a type of information to be recorded on a recording medium. Further, PCT Pub.No.WO2005/043521 discloses an arrangement wherein a high-frequency recording signal has a different level from that of a high-frequency reproduction signal and wherein the level of the high-frequency signal is changed a predetermined time prior to transition from a reproduction mode to a recording mode.

SUMMARY OF THE INVENTION

Because of difference of the laser power between a recording operation and a reproduction operation, and performance variations among individual devices or individual optical disks, the feedback light may sometimes induce instable recording operation. When recording on a multilayer disk including a plurality of recording layers, in particular, the recording operation becomes more instable due to interference with the feedback light from the other layers.

Figure 9A:
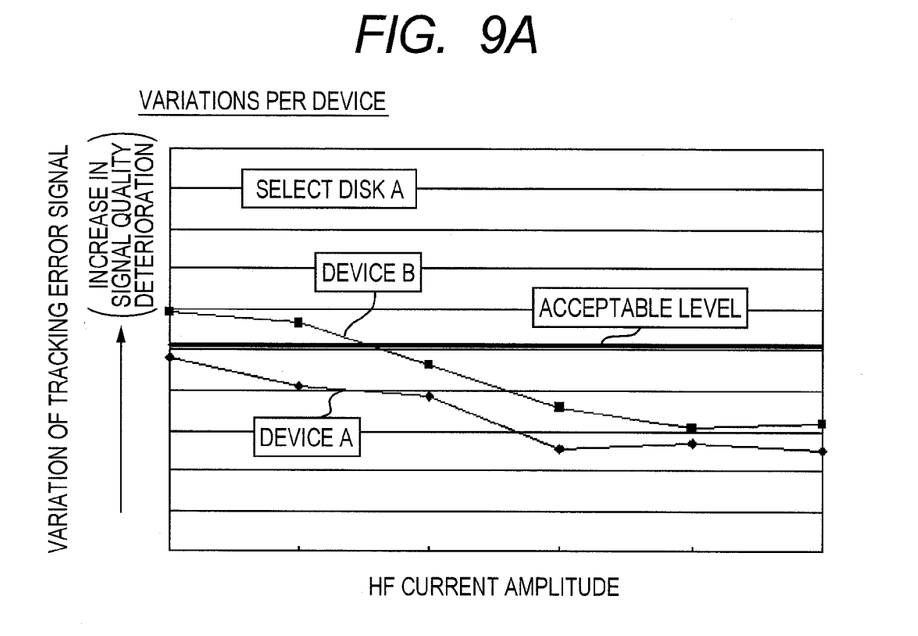
FIG. 9A and FIG. 9B are charts each showing a relation between the variation of tracking error signal and the amplitude of high-frequency signal.
Figure 9B:
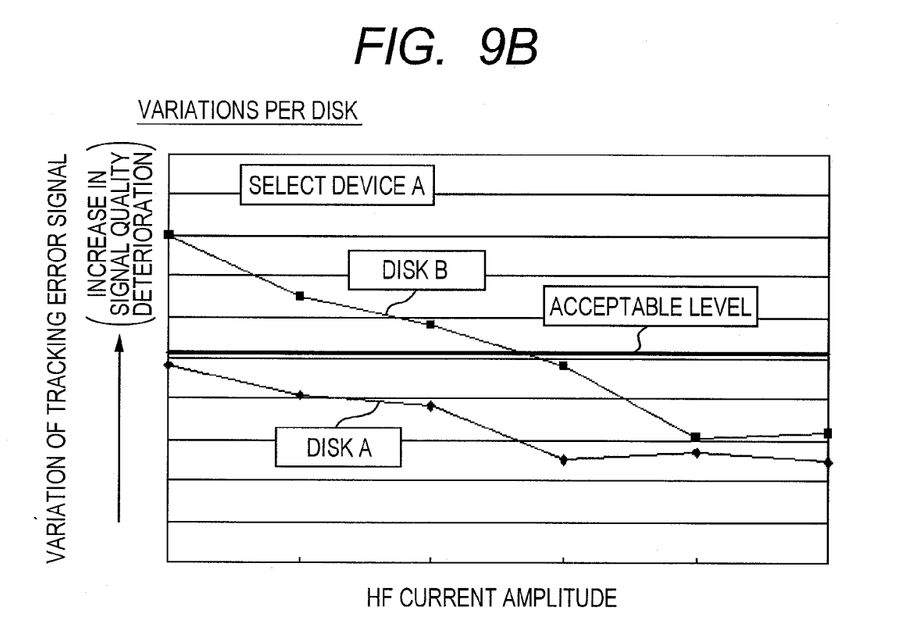

FIG. 9 is a group of charts showing a relation between the variation of tracking error signal and the amplitude of the high-frequency signal, the relation representing the instability of the recording operation. FIG. 9A shows examples of the variation per device whereas FIG. 9B shows examples of the variation per optical disk. In the charts, the ordinate is the variation of the amplitude of tracking error signal (TE signal) in one revolution of the disk. By increasing the amplitude (HF amplitude) of the high-frequency current for superposition, the variation of the tracking error signal can be decreased to less than an acceptable level. However, the variation varies between individual devices (Device A, Device B) or between individual optical disks (Disk A, Disk B) and hence, the amplitude (HF amplitude) of the high-frequency current that provides the minimum signal variation also varies.

The following reasons are cited for the tracking error signal varying during the recording time.

(1) During the recording time, a photodetector is operated at lower responsivity than during the reproduction time in order to avoid saturation of a signal processor circuit. Therefore, the signal is more susceptible to feedback light noises. Particularly in a case where a servo signal such as the tracking error signal is synthesized from main and sub signals, into which an emitted laser light (light toward the disk) or reflected light from the disk is divided, the synthesized signal is more susceptible to the noises because the sub signal of a lower level is amplified to be used.

(2) In the multilayer disk, on the other hand, a stray light (unwanted light) from layers other than a recording/reproducing subject layer (the other layers) is increased to the level of the sub signal, causing deterioration of S/N ratio of the servo signal. The level of the stray light from the other layers depends not only upon an optical system of the optical pickup but also upon a disk configuration. That is, the level of the stray light varies according to a thickness between a disk surface and a recording layer, or according to a thickness between respective pairs of recording layers (inter-layer thickness) of the multilayer disk. Even in one disk, the inter-layer thickness may vary between radial positions so that the influence of the stray light may vary according to the radial position of the optical pickup.

Thus, the optimum value of the high-frequency current varies because of performance variations of the devices and disks. Therefore, it is necessary to determine and set the optimum value each time the recording operation is performed.

According to the above-described the JP-A No. 2000-163782 and the PCT Pub.No.WO2005/043521, the high-frequency current is switched to one of predetermined values according to an operation mode (recording mode, reproduction mode) in a single uniform way. However, the high-frequency current is not adjusted to the optimum value according to the performance variation of the device or disk. If such an adjustment is made, a common approach is to determine the optimum amplitude of the high-frequency current based on the quality (jitter, error rate) of a data reproduction signal (see, for example, PCT Pub.No.WO2005/043521). This evaluation method is to identify the quality of the reproduction signal and thence, does not reflect the stability of the recording operation.

In the case of the two split main/sub signals as described in the above reason (1), the reproduction signal is generated only from the main signal whereas the servo signal (tracking error signal) is generated from the sub signal and the like. Therefore, the optimum HF amplitude for the reproduction signal does not always agree with the optimum HF amplitude for the sub signal. Particularly in the case of the multilayer disk as described in the above reason (2), the prevention of servo deviation (tracking deviation), which is more likely to be caused by the stray light, requires a more suitable evaluation method than the quality identification of the reproduction signal.

The evaluation method based on the reproduction signal involves the steps of recording test signals on a disk and subsequently reproducing the test signals in the varied HF amplitude. This method takes a large amount of time to accomplish the evaluation. Therefore, this evaluation method does not lend itself to such a frequent adjustment of HF amplitude as to be made each time the combination of the device and disk is changed or to be made at different radial positions on the disk.

The invention seeks to stabilize a servo control operation during the recording time by quickly adjusting the amplitude of the high-frequency current superimposed on the recording laser driving current according to the performance variation of the optical disk or device.

An optical disk device according the invention comprises: an optical pickup which applies a laser light from a laser light source onto an optical disk and detects a feedback light from the optical disk; a signal processor circuit which processes a detection signal supplied from the optical pickup; and a controller which controls operations of the whole device. The controller performs the operations of: disabling tracking servo and establishing conditions for reproducing a signal from a predetermined region of the optical disk when adjusting a high-frequency current superimposed on a driving current for the laser light source; controlling the optical pickup to superimpose the high-frequency current varied in amplitude on the driving current for the laser light source and enabling the signal processor circuit to generate a tracking error signal; determining an amplitude of the high-frequency current that provides an optimum quality of the generated tracking error signal; and setting the determined amplitude of the high-frequency current as that of the high-frequency current superimposed on the driving current for the laser light source when recording data on the optical disk.

An optical disk recording method according to the invention comprises the steps of: disabling tracking servo and establishing conditions for reproducing a signal from a predetermined region of an optical disk; generating a tracking error signal by superimposing a high-frequency current varied in amplitude on a driving current for a laser light source; determining an amplitude of the high-frequency current that provides an optimum quality of the generated tracking error signal; and recording data on the optical disk by applying the driving current for the laser light source superimposed with the high-frequency current of the determined amplitude.

According to the invention, the servo control operation during the recording time can be stabilized by quickly adjusting the amplitude of the high-frequency current superimposed on the recording laser driving current according to the performance variation of the optical disk or optical disk device.

DETAILED DESCRIPTION OF THE EMBODIMENT

Preferred embodiments of the invention will be described as below with reference to the accompanying drawings.

Figure 1:
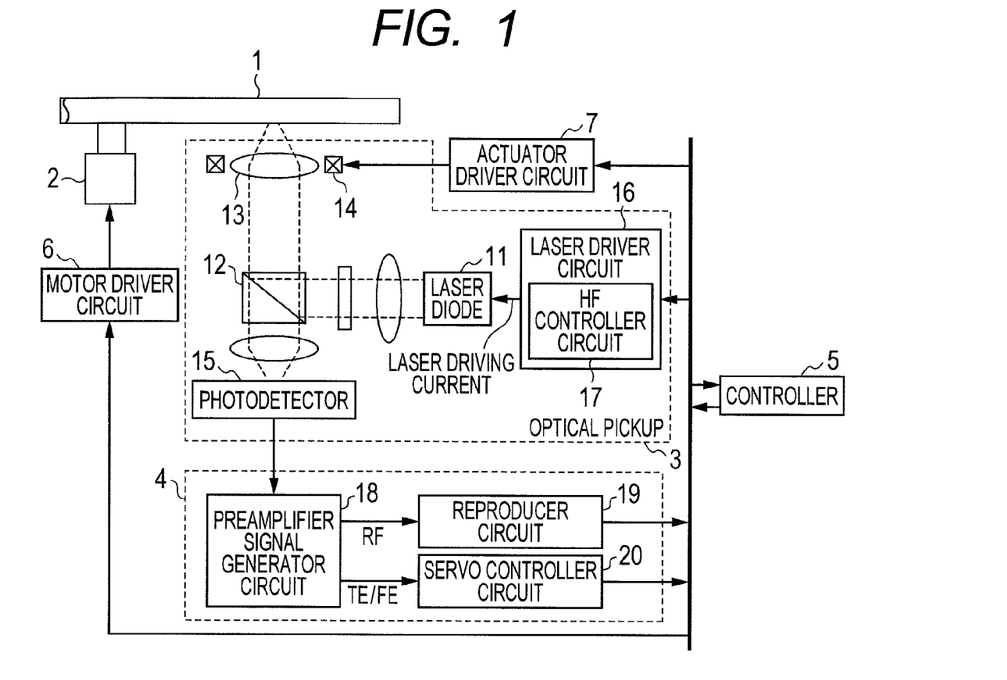
FIG. 1 is a block diagram showing a structure of an optical disk device according to one embodiment of the invention.

FIG. 1 is a block diagram showing a structure of an optical disk device according to one embodiment of the invention. It is noted that only the components particularly related to the invention are shown in FIG. 1.

The optical disk device includes: a spindle motor 2 for rotating an optical disk 1; an optical pickup 3 applying a laser light onto the optical disk 1 and detecting a feedback light from the optical disk 1; a signal processor circuit 4 for processing a detection signal supplied from the optical pickup 3; and a controller 5 including a microcomputer controlling operations of the whole device. The spindle motor 2 is driven by a motor driver circuit 6. The optical pickup 3 is driven by an unillustrated stepping motor in a radial direction of the disk.

The optical pickup 3 includes: a laser diode 11 as a laser light source; a beam splitter 12 reflecting light beams from the laser diode 11 toward the optical disk 1 but transmitting feedback light from the optical disk 1; an objective lens 13 for focusing the light beams on a recording surface of the optical disk 1; an actuator 14 for regulating tracking and focusing operations of the objective lens 12; a photodetector 15 for detecting the feedback light through the beam splitter 12 and converting the detected light into an electric signal; and a laser driver circuit 16 for supplying an emission driving current to the laser diode 11. The laser driver circuit 16 includes an HF controller circuit 17 for controlling a high-frequency current (HF) superimposed on the laser driving current. The actuator 14 is driven by an actuator driver circuit 7.

The signal processor circuit 4 includes a preamplifier signal generator circuit 18, a reproducer circuit 19 and a servo controller circuit 20. The preamplifier signal generator circuit 18 generates, from an output signal from the photodetector 15, an RF signal, a wobble signal, a tracking error (TE) signal and a focus error (FE) signal. The reproducer circuit 19 reproduces data from the RF signal and acquires address information from the wobble signal. The servo controller circuit 20 generates an actuator control signal from the tracking error (TE) signal and the focus error (FE) signal.

Figure 2:
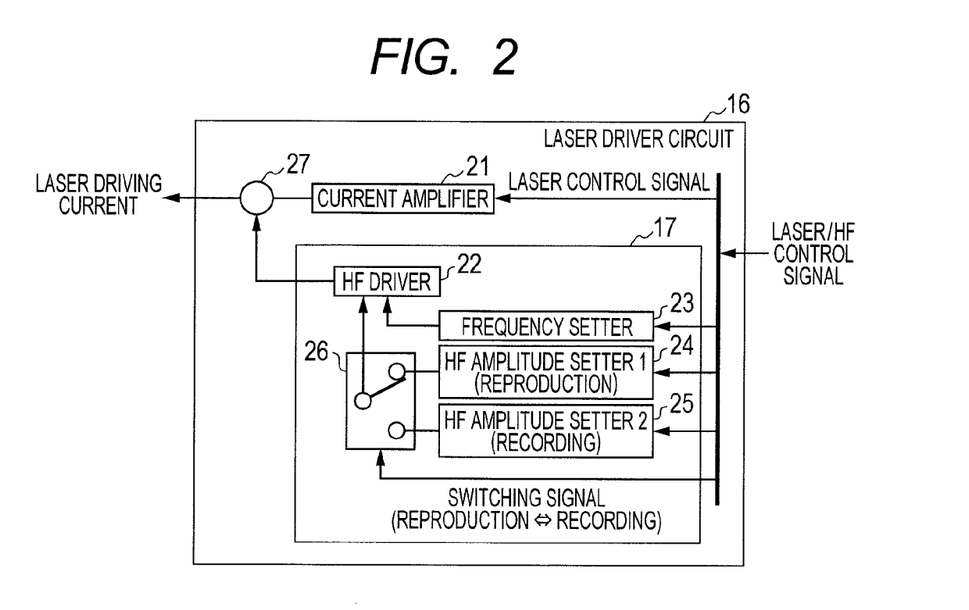
FIG. 2 is a block diagram showing an internal configuration of a laser driver circuit 16.

FIG. 2 is a block diagram showing an internal configuration of the laser driver circuit 16. The controller 5 inputs to the laser driver circuit 16 a laser emission control signal for recording/reproduction operation (laser control signal) and a control signal for high-frequency current superimposed on this control signal (HF control signal). In response to the laser control signal, a current amplifier 21 supplies a laser emission current for recording/reproduction operation. In response to the HF control signal, a high-frequency current driver 22 supplies the high-frequency current (HF). At this time, a frequency setter 23 sets the frequency of the high-frequency current while a first amplitude setter 24 and a second amplitude setter 25 set the amplitude of the high-frequency current. Specifically, the first amplitude setter 24 retains the amplitude of HF reproduction signal while the second amplitude setter 25 retains the amplitude of HF recording signal. A switch 26 switches the HF amplitude between a reproduction operation and a recording operation. An adder 27 superimposes the high-frequency current (HF) on the laser emission current. The resultant laser driving current is supplied to the laser diode 11.

Figure 3:
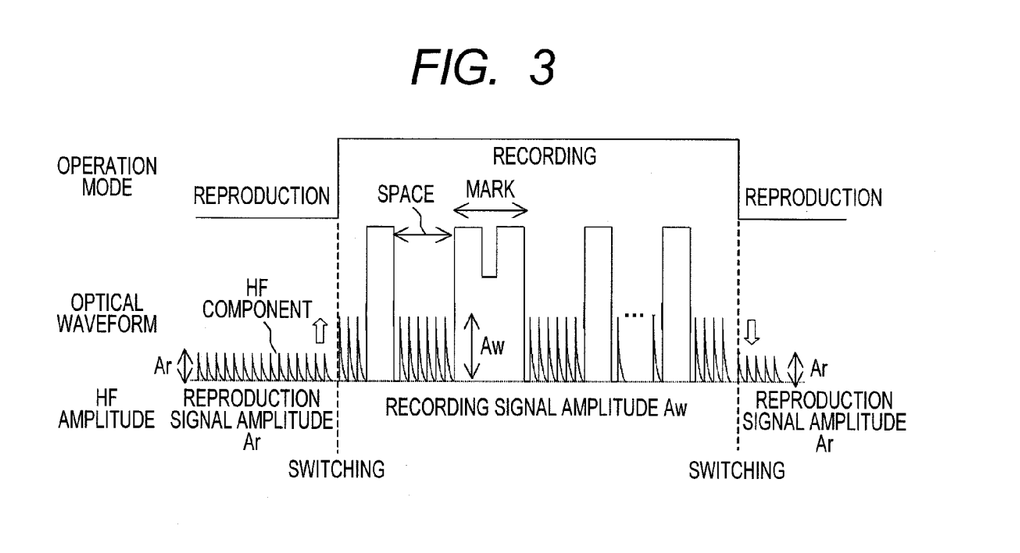
FIG. 3 is a chart schematically showing waveforms of laser light emitted for recording/reproduction operations.

FIG. 3 is a chart schematically showing waveforms of laser light emitted for recording/reproduction operations.

In a reproduction mode, a high-frequency signal having an HF reproduction amplitude Ar is superimposed on a reproduction power. In a recording mode, a high-frequency signal having an HF recording amplitude Aw is superimposed only on a space interval of record data (Namely, the high-frequency signal is not superimposed on a mark forming interval in this method). This is done for the purpose of obviating a problem that the laser diode is made to output a power over its rated value by superimposing the high-frequency signal on the mark interval and a breakage of the laser diode results. Such a space interval superposition method is effective in a method (sampled servo method) wherein a servo signal is generated from a feedback light signal from the optical disk that is acquired from the space interval of the recording operation.

The amplitude of the high-frequency signal for superposition is defined such that the recording signal amplitude Aw is greater than the reproduction signal amplitude Ar. The optimum value of the reproduction signal amplitude Ar is determined by evaluating the quality (e.g., jitter and reproduction error) of the reproduction signal. On the other hand, the optimum value of the recording signal amplitude Aw is determined by evaluating the quality of the servo signal (tracking error signal), as will be described hereinlater, particularly for the purpose of reducing the instability of servo characteristic which is attributable to the stray light in the other layers of the multilayer disk. Because of the different evaluation methods, the recording signal amplitude Aw is greater than the reproduction signal amplitude Ar.

In the laser diode 11, a relation between the laser driving current and a laser emission power (I-L characteristic) exhibits a non-linear characteristic. Since a driving current equal to or less than a threshold value effects little laser emission, the waveform of HF laser output light is up-down asymmetric. Strictly saying, the amplitude of the driving current is not proportional to the amplitude of the waveform of the output light. In the following description, however, the same symbols Ar, Aw refer to the amplitudes of these parameters.

According to the embodiment, the HF reproduction signal amplitude Ar and the HF recording signal amplitude Aw are retained by the first and second setters 24, 25, respectively. These HF signal amplitudes can be instantaneously switched and set by the switch 26 operative in synchronism with a reproduction/recording switching signal from the controller 5. Thus, a stable operation is also ensured in intervals before and after the operation mode change.

The following description is made on a method for determining the optimum amplitude Aw at the recording time. In this embodiment, the optimum value is determined by evaluating the quality of the tracking error signal (TE signal) as the servo signal.

The optical pickup 3 is moved to a given radial position on the disk and is operated to read the disk while disabling tracking servo of a servo controller circuit 20. Since the TE signal has different levels between a recorded region and an unrecorded region on the disk, the measurement is taken at place not spanning these regions. The laser driver circuit 16 responds to the control signal from the controller 5 so as to excite the laser diode 11 with a laser emission current of a predetermined power (e.g., reproduction power) superimposed with an HF current (HF) varied in amplitude. The photodetector 15 converts the reflected light from the disk into an electrical signal while the preamplifier 18 generates the tracking error signal.

Figure 4:
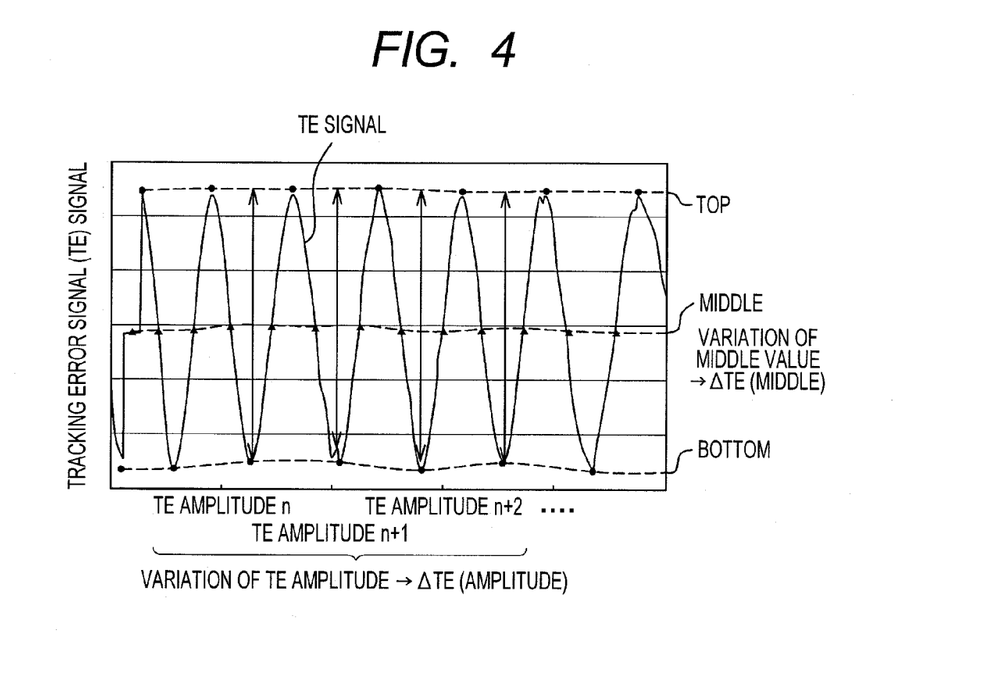
FIG. 4 is a chart showing an exemplary waveform of a tracking error signal.

FIG. 4 is a chart showing an exemplary waveform of the tracking error signal. The generated tracking error signal (TE signal) is sent to the controller 5, which captures data for a given time period (e.g., a time taken for one revolution of the disk) by means of an AD converter. It is noted that a sampling period of the AD converter is sufficiently shorter than the frequency of the TE signal. The controller 5 performs the following calculation operation.

First, the controller extracts the maximum value (TOP) and the minimum value (Bottom) from each of the peaks of the captured signal. Based on these values, the controller evaluates the quality of the TE signal using any of the following methods.

Evaluation Method (1): using the variation of TE signal amplitude in a given time period as an index. The difference between the Top (n) and the Bottom (n) of the n-th signal of the measured data is defined as TE amplitude (n).

$$\text{TE amplitude}(n) = \text{Top}(n) - \text{Bottom}(n)$$

The maximum value of the TE amplitudes (n) within a given time period is defined as TE amplitude (Max) and the minimum value thereof are defined as TE amplitude (Min). A difference between these TE amplitude values is defined as TE amplitude variation $\Delta$TE (amplitude).

$$\Delta\text{TE(amplitude)} = \text{TE amplitude(Max)} - \text{TE amplitude(Min)}$$

Alternatively, the standard deviation of the TE amplitude (n) within a predetermined time period may also be defined as the TE amplitude variation $\Delta$TE (amplitude).

Evaluation Method (2): using the variation of TE amplitude middle within the given time period as the index. The middle of amplitude between the Top (n) and the Bottom (n) of the n-th signal of the measured data is defined as TE Middle (n).

$$\text{TE Middle}(n) = \{\text{Top}(n) + \text{Bottom}(n)\}/2$$

The maximum value of the TE Middles (n) within the given time period is defined as TE Middle (Max) while the minimum value thereof is defined as TE Middle (Min). The difference between these TE Middle values is defined as variation of TE Middle $\Delta$TE (Middle).

$$\Delta\text{TE(Middle)} = \text{TE Middle(Max)} - \text{TE Middle(Min)}$$

Alternatively, the standard deviation of the TE Middle (n) within a predetermined time period may also be defined as the variation of TE Middle $\Delta$TE (Middle).

Figure 5:
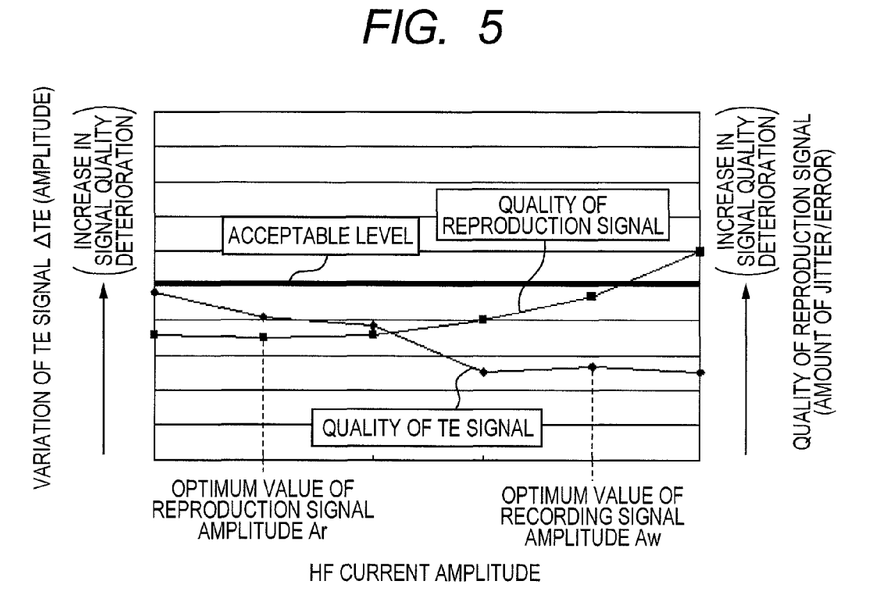
FIG. 5 is a chart explaining a method of determining an optimum value of HF amplitude.

FIG. 5 is a chart explaining a method of determining an optimum value of the HF amplitude. In this chart, the amplitude of the high-frequency current (HF) for superposition is plotted on the abscissa while the variation $\Delta$TE of measured tracking error (TE) signal is plotted on the left-side ordinate and the quality (jitter amount) of measured reproduction signal is plotted on the right-side ordinate. While this chart shows the variation of TE amplitude $\Delta$TE (amplitude) as the index of TE signal quality, it makes no difference if the variation of TE Middle $\Delta$TE (Middle) is used as the index. Furthermore, it makes no difference if the amount of reproduction error is used as the index of the quality of reproduction signal.

As apparent from the chart, the quality of reproduction signal is more deteriorated with the increase in the HF amplitude. Conversely, the variation of TE signal $\Delta$TE is less deteriorated with the increase in the HF amplitude. Accordingly, the HF reproduction signal amplitude Ar has a relatively small optimum value whereas the HF recording signal amplitude Aw has a relatively great optimum value. Such a contrast between the HF reproduction signal amplitude Ar and the HF recording signal amplitude Aw is attributable to a fact that the reproduction signal is generated only from a main signal of the detection signal of the photodetector whereas the TE signal is generated by synthesis of the main signal and a sub signal of the detection signal. In other words, the method of the embodiment is particularly effective in a case where the photodetector 15 performs dual-band signal detection (main/sub signals) for generation of the servo signal (TE signal).

It is preferred to determine the optimum value of the HF reproduction signal amplitude Ar taking disk damage caused by the reproduction power (reproduction resistance) and electromagnetic interference (EMI) performance into consideration. It is also preferred to define an upper limit and a lower limit of the HF recording signal amplitude Aw from the viewpoint of recording quality (quality of configuration of formed mark) and the electromagnetic interference (EMI) performance.

A procedure for adjusting the HF recording signal amplitude will hereinbelow be described by way of a few examples. The HF amplitude is adjusted each time a loaded disk is changed, each time the environment (temperature and the like) changes. In the case of the multilayer disk, in particular, the adjustment may preferably be made each time a recording layer as a recording object is changed. However, an alternative approach may also be taken wherein the adjustment is previously made on one representative recording layer and correction is made on the other recording layers using a coefficient previously determined from the adjustment results.

Figure 6:
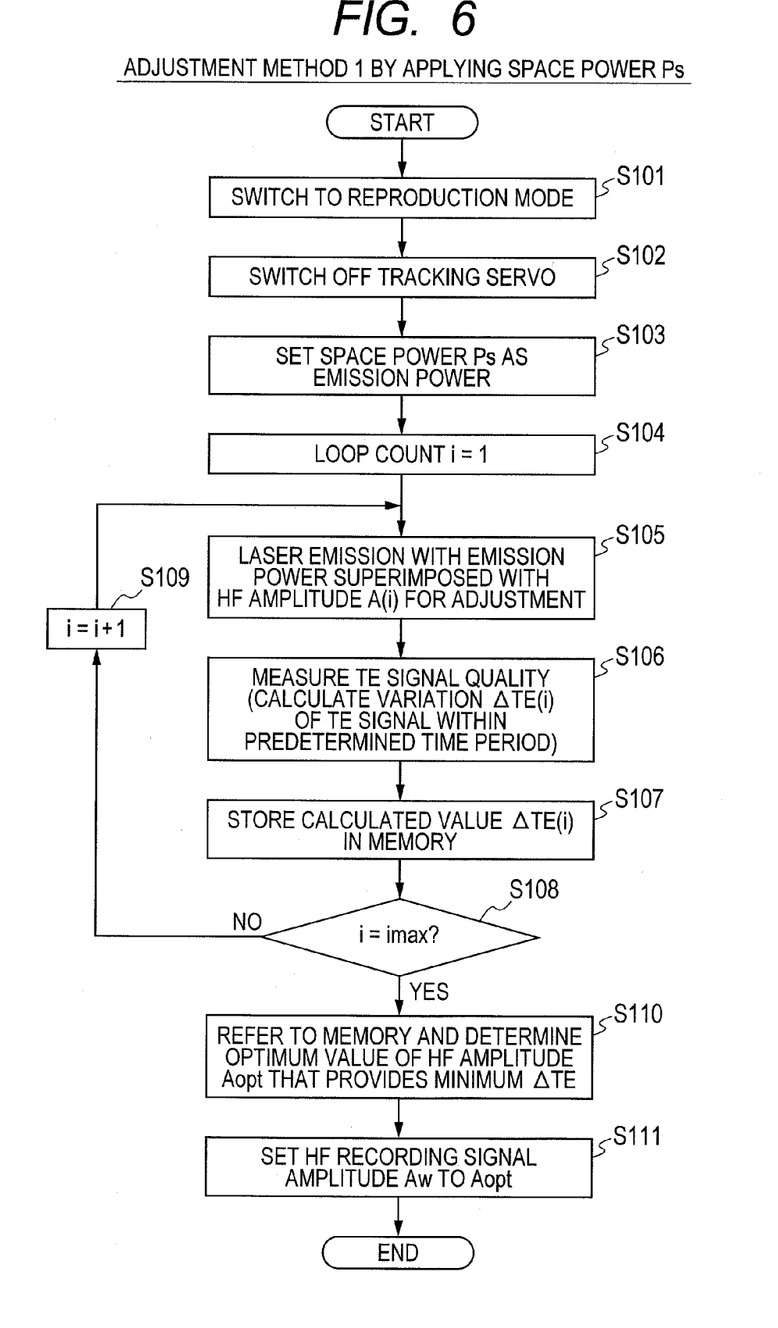
FIG. 6 is a flow chart showing the steps of a first method for adjusting the amplitude of HF recording current.

FIG. 6 is a flow chart showing the steps of a first method for adjusting the HF recording signal amplitude. The following steps are controlled by the controller 5.

In Step S101, the controller switches the device to the reproduction mode in response to a command to adjust the HF recording signal amplitude.

In Step S102, the controller moves the optical pickup 3 to a given radial position on the disk and switches off a tracking servo function of the servo controller circuit 20.

In step S103, the laser driver circuit 16 sets a space power Ps as an emission power to excite the laser diode 11. This space power Ps is equivalent to a value of power applied to a space interval during the recording operation.

In Step S104, the controller sets the loop count i to 1. The loop count i means the number of repetitions of loops performed to change the HF amplitude.

In Step S105, the laser driver circuit 16 (HF controller circuit 17) sets the HF amplitude A(i) for superposition on the laser emission power so as to excite the laser diode 11. The values of the HF amplitude A(i) superimposed at this time is previously stored in the HF amplitude setter 24 and selected according to the value of the loop count i.

In Step S106, the preamplifier 18 generates the tracking error signal (TE signal) in response to the detection signal from the photodetector 15 and sends the resultant signal to the controller 5. The controller 5 captures the data for a predetermined time period (e.g., time taken for one revolution of the disk), based on which the quality of the TE signal is measured. Specifically, the variation ΔTE of TE amplitude or TE middle in the predetermined time period is calculated and defined as ΔTE(i).

In Step S107, the calculated variation of TE signal ΔTE(i) is stored in a memory of the controller 5.

In Step S108, the controller determines whether the loop count i has reached the maximum value imax or not. While the maximum value imax is optional, the maximum value is set to imax=5, for example. If the loop count i is less than the maximum value imax (=5), the control flow proceeds to Step S109 to increment the loop count i by 1 and then, returns to Step S105 to repeat the above-described steps S106 and S107. Thus, variations ΔTE(i) of the TE signals for i=1 to imax are stored in the memory.

When the loop count i reaches the maximum value imax, the control flow proceeds to Step S110. In Step S110, the controller refers to the memory to determine an HF amplitude Aopt that provides the minimum variation ΔTE(i) of TE signal.

In Step S111, the controller sets the HF recording signal amplitude Aw to the HF amplitude Aopt and stores the set value in the second HF (recording signal) amplitude setter 25 of the HF controller circuit 17. Thus, the HF recording signal amplitude for the loaded disk can be optimized.

Figure 7:
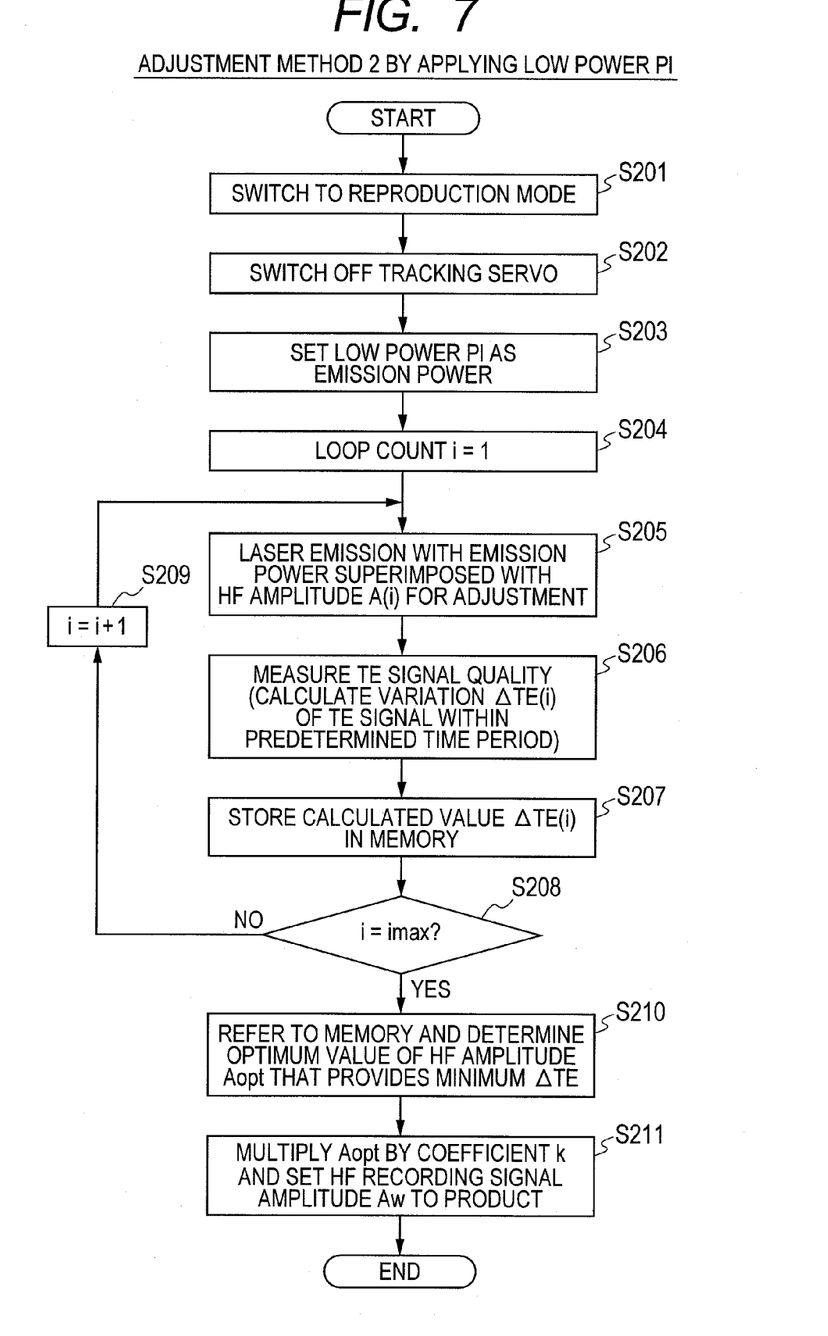
FIG. 7 is a flowchart showing the steps of a second method for adjusting the amplitude of HF recording current.

FIG. 7 is a flow chart showing the steps of a second method for adjusting the HF recording signal amplitude. The second adjustment method is basically the same as the first adjustment method shown in FIG. 6, except that the emission power applied for adjustment is set to a different value from that of the space power Ps applied in the first adjustment method. Only the steps different from those of FIG. 6 are described and the description of the other steps is dispensed with.

In Step S203, the controller sets the emission power to a low power Pl. This power is used for establishing a pseudo recording mode and has intensity not enough to accomplish signal recording on the disk.

In Step S211, the controller multiplies the HF amplitude Aopt by a coefficient k and sets the HF recording signal amplitude Aw to the product. This coefficient k is a correction factor dependent on a ratio of the low power Pl to the space power Ps. If Pl>Ps, the coefficient has a value k<1. If Pl<Ps, the coefficient has a value k>1.

Figure 8:
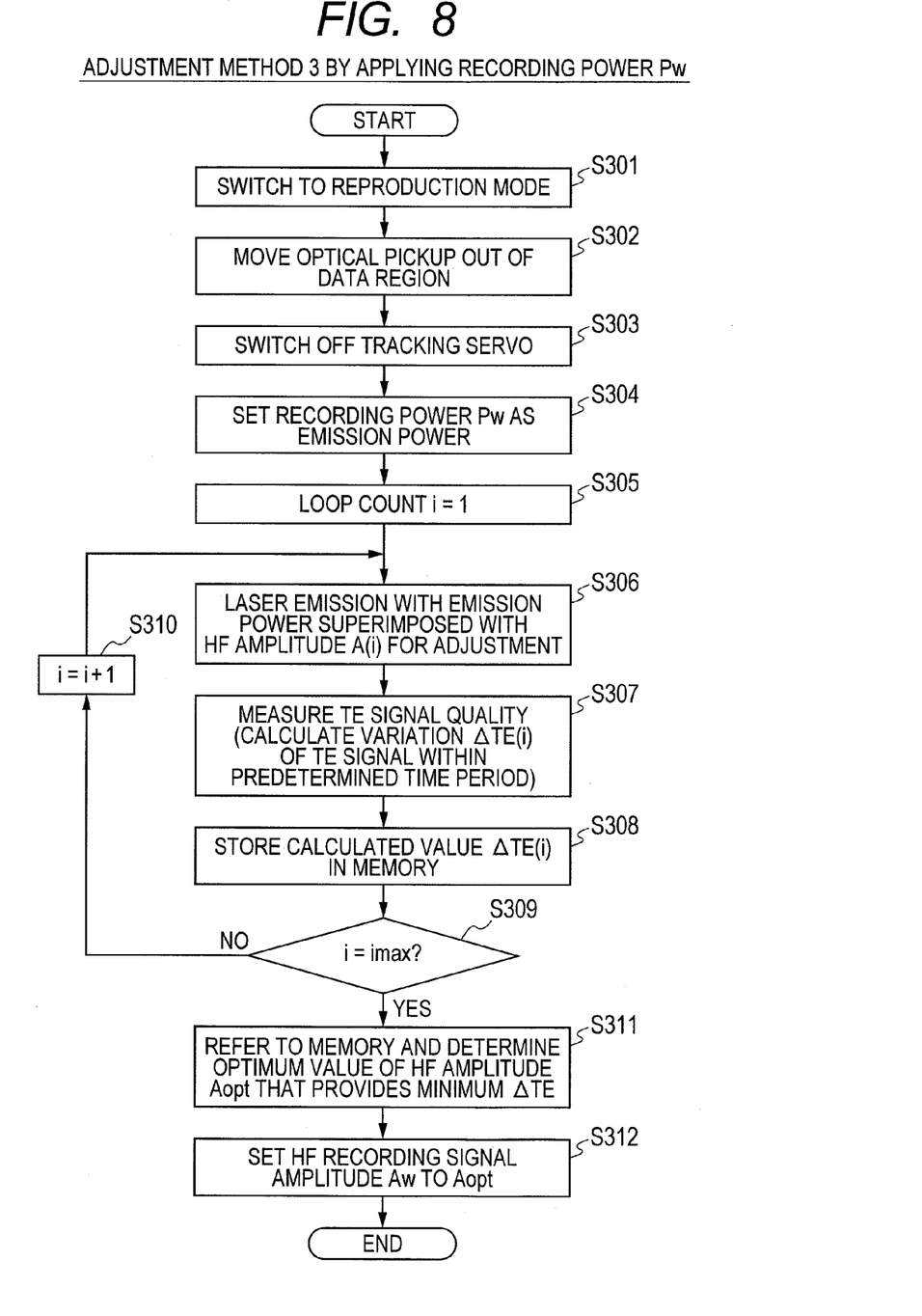
FIG. 8 is a flow chart showing the steps of a third method for adjusting the amplitude of HF recording current.

FIG. 8 is a flow chart showing the steps of a third method for adjusting the HF recording signal amplitude. The third adjustment method is also basically the same as the first adjustment method shown in FIG. 6, except that a recording power Pw is adopted as the emission power applied for adjustment. Only the steps different from those of FIG. 6 are described and the description of the other steps is dispensed with.

In Step S302, the controller moves the optical pickup 3 out of a data region on the disk. This is done for the purpose of preventing data stored in the data region from being erased or destroyed by the adjustment operation.

In Step S304, the controller sets the emission power to the recording power Pw. While the recording power Pw includes mark and space patterns, the high-frequency current HF is superimposed only on the space interval. A signal having the recording power Pw may be an optional data signal or a test signal for adjustment.

The third adjustment method permits the adjustment to be made under conditions nearest to the actual recording conditions. Therefore, the optimum amplitude of the HF recoding current can be determined with higher accuracy.

While the embodiments of the invention have been described in detail, the following modifications may also be contemplated.

While the foregoing embodiments focus attention on the quality of the tracking signal (TE signal) as the servo signal in the determination of the optimum value of the high-frequency recording current (HF), the quality of a focus error signal (FE signal) may also be used as the index. The foregoing embodiments address optimization of the amplitude of the high-frequency current (HF amplitude). However, this approach may be replaced by optimization of the rate of peak level of high-frequency signal to average emission power (namely, degree of modulation).

In the multilayer disk, the inter-layer thickness may vary depending upon the radial position on the disk. In such a case, the influence of the inter-layer thickness variation can be reduced by taking the steps of making adjustment on plural different radial positions and interpolating an optimum value for any radial position on the data pieces acquired by making adjustment on the different radial positions because the stray light varies according to the inter-layer thickness. Furthermore, the stray light also varies between individual recording layers. The influence of the stray light variation can be reduced by making similar adjustment on each of the individual recording layers.

According to the embodiments of the invention, a stable recording operation is always ensured because the high-frequency current can be optimized for each different disk-device combination or each time the operating environment changes. Further, the adjustment can be made on the device in the reproduction mode because the servo signal evaluated for making adjustment can be acquired even from an unrecorded (fresh) disk. That is, a step of recording the evaluation test signal on the disk is not needed and hence, an effect to shorten adjustment time is obtained. The adjustment methods shown in FIG. 6 and FIG. 7 dramatically facilitate an adjustment work because the adjustment can be made at any radial position (including the data region) on the disk and at any time (during the recording operation or pause).

What is claimed is:

1. An optical disk device for recording data on an optical disk by driving a laser light source with a driving current superimposed with a high-frequency current, comprising:
   an optical pickup which applies a laser light from the laser light source onto the optical disk and detects a feedback light from the optical disk;
   a signal processor circuit which processes a detection signal supplied from the optical pickup; and
   a controller which controls operations of the whole device, the controller performing the operations of:
   disabling tracking servo and establishing conditions for reproducing a signal from a predetermined region of the optical disk when adjusting the high-frequency current superimposed on the driving current for the laser light source;
   controlling the optical pickup to superimpose the high-frequency current varied in amplitude on the driving current for the laser light source and enabling the signal processor circuit to generate a tracking error signal;
   determining an amplitude of the high-frequency current that provides an optimum quality of the generated tracking error signal; and
   setting the determined amplitude of the high-frequency current as that of the high-frequency current superimposed on the driving current for the laser light source when recording data on the optical disk.

2. The optical disk device according to claim 1, wherein the controller uses a variation of the amplitude or amplitude middle value of the tracking error signal within a predetermined time period as an index representing the quality of the tracking error signal.

3. The optical disk device according to claim 1, wherein when recording data on the optical disk, the controller superimposes the high-frequency current of the determined amplitude only on a space interval of record data.

4. The optical disk device according to claim 1, wherein the optical pickup retains an amplitude of the high-frequency current to be superimposed for reproduction of data from the optical disk and an amplitude of the high-frequency current to be superimposed for recording data on the optical disk and, in synchronism with a reproduction/recording signal supplied from the controller, switchably sets the high-frequency current to one of the amplitudes that corresponds to the signal.

5. An optical disk recording method of recording data on an optical disk by driving a laser light source with a driving current superimposed with a high-frequency current, comprising the steps of:
   disabling tracking servo and establishing conditions for reproducing a signal from a predetermined region of the optical disk;
   generating a tracking error signal by superimposing the high-frequency current varied in amplitude on the driving current for the laser light source;
   determining an amplitude of the high-frequency current that provides an optimum quality of the generated tracking error signal, and
   recording data on the optical disk by applying the driving current for the laser light source superimposed with the high-frequency current of the determined amplitude.

6. The optical disk recording method according to claim 5, wherein a variation of the amplitude or amplitude middle value of the tracking error signal within a predetermined time period is used as an index representing the quality of the tracking error signal.

7. The optical disk recording method according to claim 5, wherein when data is recorded on the disk, the high-frequency current of the determined amplitude is superimposed only on a space interval of record data.

8. The optical disk recording method according to claim 5, wherein
   the amplitude of the high-frequency current is adjusted based on the tracking error signal each time an optical disk for data recording is changed.

9. The optical disk recording method according to claim 8, wherein
   in a case where the optical disk is a multilayer disk including a plurality of recording layers, the adjustment of the amplitude of the high-frequency current is made at plural different radial positions on the optical disk.

10. The optical disk recording method according to claim 8, wherein
   in a case where the optical disk is a multilayer disk including a plurality of recording layers, the adjustment of the amplitude of the high-frequency current is made on each of the plural recording layers.

* * * * *